(12) United States Patent
Sulit et al.

(10) Patent No.: US 11,373,256 B2
(45) Date of Patent: *Jun. 28, 2022

(54) EDITING AND REPRESENTING PROPERTY VALUES FOR A DIGITAL MAP

(71) Applicant: Mapbox, Inc., San Francisco, CA (US)

(72) Inventors: Dana Alexander Sulit, Washington, DC (US); Saman Bemel-Benrud, Washington, DC (US); Eli Fitch, Washington, DC (US); Nicki Zippora Dlugash, Washington, DC (US)

(73) Assignee: Mapbox, Inc., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/229,250

(22) Filed: Apr. 13, 2021

(65) Prior Publication Data

US 2021/0233188 A1 Jul. 29, 2021

Related U.S. Application Data

(63) Continuation of application No. 16/395,885, filed on Apr. 26, 2019, now Pat. No. 11,037,256.

(51) Int. Cl.
*G06F 3/048* (2013.01)
*G06Q 50/16* (2012.01)
*G06F 16/29* (2019.01)
*G01C 21/36* (2006.01)
*G06Q 30/02* (2012.01)

(52) U.S. Cl.
CPC .......... *G06Q 50/16* (2013.01); *G01C 21/367* (2013.01); *G06F 16/29* (2019.01); *G06Q 30/0201* (2013.01)

(58) Field of Classification Search
CPC .... G06Q 50/16; G06Q 30/0201; G06F 16/29; G06F 16/248; G01C 21/367
See application file for complete search history.

(56) References Cited

U.S. PATENT DOCUMENTS

| | | |
|---|---|---|
| 6,307,573 B1 | 10/2001 | Barros |
| 2004/0027258 A1 | 2/2004 | Pechatnikov et al. |
| 2014/0340421 A1 | 11/2014 | Otero et al. |
| 2018/0052572 A1 | 2/2018 | Bemel-Benrud et al. |
| 2018/0210633 A1 | 7/2018 | Grochocki, Jr. et al. |

OTHER PUBLICATIONS

United States Office Action, U.S. Appl. No. 16/395,885, dated May 6, 2020, 15 pages.
United States Office Action, U.S. Appl. No. 16/395,885, dated Oct. 28, 2020, 15 pages.

*Primary Examiner* — Aleksey Olshannikov
(74) *Attorney, Agent, or Firm* — Fenwick & West LLP

(57) ABSTRACT

A process, and corresponding system for performing the process, is described for editing and representing property values for a digital map. The process retrieves electronic map data from a style sheet corresponding to a vector map tile set for a digital map. The process displays a plurality of templates and receives selection of a template. The process displays a visual map representing the electronic map with the set of map style layers of the selected template. The process displays a theme and a plurality of components. Each component is a set of map style layers and is a subset of the set of map style layers of the template. The process receives selection of a component. The process displays a plurality of property values associated with the selected component. The process receives an edit to a property value. The process updates the visual map to reflect the edited property value.

20 Claims, 9 Drawing Sheets

EDITING AND REPRESENTING PROPERTY VALUES FOR A DIGITAL MAP

CROSS-REFERENCE TO RELATED APPLICATIONS

This application is a continuation of application Ser. No. 16/395,885, filed Apr. 26, 2019, the entire contents of which is hereby incorporated by reference for all purposes as if fully set forth herein.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

This disclosure relates to digital maps. More specifically, this disclosure relates to a method of editing and representing property values for a digital map.

While digital maps and graphical user interfaces for digital maps have entered wide use, creating and editing such maps and interfaces is difficult using pre-existing software tools. Editing and authoring programs for creating digital map templates, colors, and features has been complex and required many manual operations. For example, in conventional programs, individual map style layers are displayed in a map style layer list, which prohibits a user from applying an edit across multiple map style layers simultaneously. Instead, a user is required to edit each map style layer individually. This process for customizing digital maps is inconvenient and time consuming. Therefore, there is a need for more flexible, comprehensive and convenient computer-based techniques for creating, modifying and manipulating digital maps and graphical user interfaces for digital computer display devices that display maps.

SUMMARY

As described herein, electronic map data is divided into a plurality of vector map tiles at a plurality of zoom levels, wherein each map tile corresponds to a portion of a geographic map. The map tiles are rendered when requested by a client, and each map tile is rendered based on one or more map styles, which defines the visual appearance of an electronic map, such as what map data to display in the electronic map, what order to render the data in, and how to style the data when it is rendered.

A template comprises a set of map style layers, each of which may include a reference to a portion of electronic map data and one or more visual style rules to be applied to the portion of electronic map data. Map editing instructions are programmed or configured to cause display, in a graphical user interface of a computer display device and in association with a digital map, of one or more style layer properties of the digital map. A style may be built with a plurality of components, which each include map style layers and configurable properties.

A process, and corresponding system for performing the process, is described herein for editing and representing property values for a digital map. The process retrieves electronic map data from a style sheet corresponding to a vector map tile set for a digital map. The process displays a plurality of templates, each template comprising a set of map style layers, wherein each map style layer references a portion of the electronic map data and one or more visual style rules to apply to the portion. The process receives selection of a template from the plurality of templates. Upon receiving selection of the template, the process displays a visual map representing the electronic map with the set of map style layers of the selected template. The process displays in a sidebar a theme and a plurality of components, wherein each component is a set of map style layers and is a subset of the set of map style layers of the template. The process receives selection of a component from the plurality of components. The process displays in a component property list a plurality of property values associated with the selected component. The process receives in the component property list an edit to a particular property value. The process updates the visual map to reflect the edited particular property value, wherein the edited particular property value is applied to the set of map style layers of the component.

DETAILED DESCRIPTION

Figure 1A:
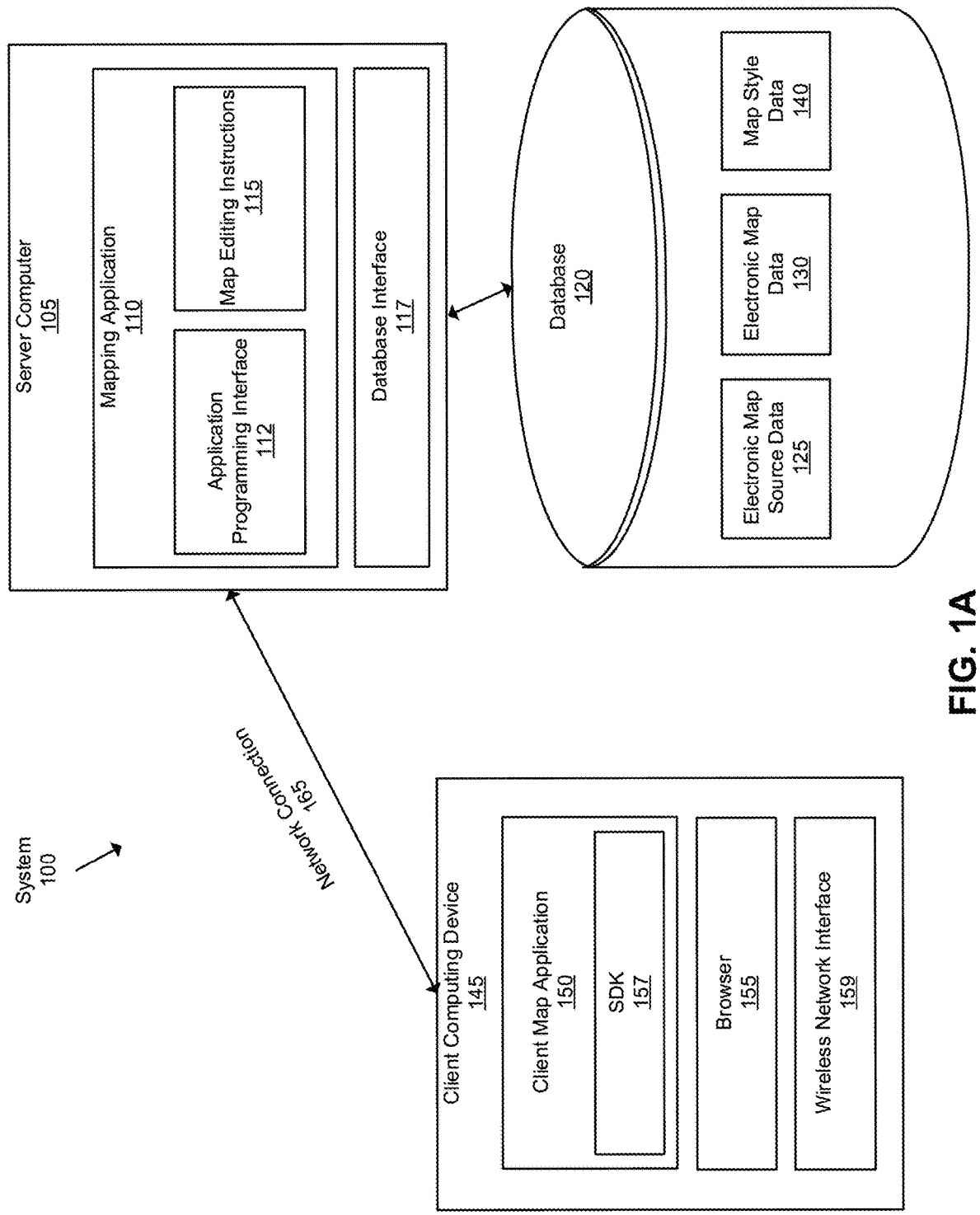
FIG. 1A illustrates an example computer system in which the techniques described herein may be practiced, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

System Overview

FIG. 1A illustrates an example computer system in which the techniques described may be practiced, according to one embodiment.

In an embodiment, a computer system 100 comprises a plurality of components that may be implemented at least partially by hardware at one or more computing devices, such as one or more hardware processors executing stored program instructions stored in one or more memories for performing the functions that are described herein. In other words, in an embodiment, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A illustrates a client computing device 145 that is coupled via a network connection 165 to a server computer 105, which is coupled to a database 120. The server computer comprises a mapping application 110, an application programming interface (API) 112, map editing instructions 115, and a database interface 117. The database 120 comprises electronic map source data 125, electronic map data 130, and map style data 140. The client computing device 145 comprises a client map application 150, browser 155, and wireless network interface 159.

In one embodiment, client computing device 145 is any computing device, such as a work station, personal computer, general purpose computer, laptop, hand-held computer, wearable computer, cellular or mobile phone, portable digital assistant (PDA), tablet computer, and the like. Although a single client computing device is depicted in FIG. 1A, any number of client computing devices may be present. Each client computing device 145 is communicatively connected to server computer 105 through network connection 165 which comprises any combination of a LAN, a WAN, one or more internetworks such as the public Internet, a cellular network, or a company network.

Client computing device 145 also includes network interface 159, which is used by the client computing device 145 to communicate with other devices. In particular, network interface 159 is used to establish network connection 165 to server computer 105. Network interface 159 may use Ethernet, WiFi, WiMAX, Bluetooth, ZigBee, cellular standards, or others.

Client computing device 145 also includes other hardware elements, such as one or more input devices, memory, processors, and the like, which are not depicted in FIG. 1A. Client computing device 145 also includes applications, software, and other executable instructions to facilitate various aspects of embodiments described herein. These applications, software, and other executable instructions may be installed by a user, owner, manufacturer, or other entity related to the client computing device.

In one embodiment, client computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods, or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In one embodiment, client computing device 145 includes browser 155. Browser 155 is a computer application that may request and execute instructions received from web servers to generate complex user interfaces that are presented to a user through one or more devices, such as a display or speakers. In response to input from a user, such as a mouse click indicating that the user selected an object defined in the instructions, such as a button or a text box, a browser may send a request based on the selected object to the web server. The request may be a request for data or include data to be processed by the web server. In an embodiment, browser 155 may receive instructions from server computer 105 to generate a user interface of a map editing program through which a user may create and modify map styles. Additionally or alternatively, client computing device 145 may include a map editing application or software that provides map editing functions as part of the application or software.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1A shows a single element, the server computer 105 broadly represents one or more multiple server computers, such as a server cluster, and the server computer 105 may be located in one or more physical locations. Server computer 105 may also represent one or more virtual computing instances that execute using one or more computers in a datacenter such as a virtual server farm.

Server computer 105 is communicatively connected to database 120 and client computer device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of customer software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1A, database 120 may span multiple devices located in one or more physical locations. For example, database 120 may include one or nodes located at a data warehouse(s). Additionally, in one embodiment, database 120 may be located on the same device(s) as server computer 105. Alternatively, database 120 may be located on a separate device(s) from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, map tile filter 135, and map style data 140. These datasets may be stored as columnar data in a relational database or as flat files.

In one embodiment, electronic map source data 125 is raw digital map data that is obtained, downloaded, or received from a variety of sources. The raw digital map data may include satellite images, digital street data, building or place data, or terrain data. Example sources include National Aeronautics and Space Administration (NASA), United States Geological Survey (USGS), and DigitalGlobe. Raw digital map data may also be defined by a user and uploaded to the server computer. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector map tiles which may be subject to map style data to impose different display styles. Electronic map data 130 may be updated at any suitable interval, and may include additional information beyond that derived from electronic map source data 125.

In an embodiment, electronic map data is divided into a plurality of vector map tiles at a plurality of zoom levels, wherein each map tile corresponds to a portion of a geographic map. For example, a map tile may correspond to a square area of a geographic map at a particular zoom level, or an area of a pre-defined size and location within a geographic map. In an embodiment, the portion of electronic map data within each map tile may be organized in a compact, structured format, such as the Mapbox Vector Tile Specification format, by Mapbox, Inc., San Francisco, Calif. Additionally or alternatively, electronic map data 130 may comprise a plurality of map tile sets. A first set of map tiles may include electronic map data derived from a first set of electronic map source data, while a second set of map tiles may include electronic map data derived from a second set of electronic map source data.

In an embodiment, a map tile contains data describing map geometries, such as points, lines, and polygons, of features on the map. Additionally or alternatively, the map tile contains metadata, such as road names, place names, house numbers, feature types, and other properties. For example, electronic map data in a vector map tile corresponding to a portion of a geographic map may include geometry data representing roads, buildings, water, parks, and etc. to be depicted within the portion of the geographic map, as well as geometries for suggested placement of labels and other cartographic features. The map tile may also include metadata corresponding to each feature, such as names that can be rendered as labels on a digital map. Additionally or alternatively, the metadata includes data indicating the portion of the geographic map that the map tile corresponds to. For example, the metadata may include data indicating one or more coordinates of the map tile or one or more boundaries of the map tile. Additionally or alternatively, the metadata includes data indicating the zoom level at which that map tile is to be displayed.

In an embodiment, electronic map data is further organized into a plurality of data layers. Electronic map data may describe a plurality of map features, such as buildings, water, roads, etc. The map features may be grouped into the plurality of data layers. For example, a "Road" data layer may include map features such as streets, bridges, freeways, paths, and etc. As another example, a "Water" data layer may include map features such as rivers, lakes, oceans, canals, and etc.

In an embodiment, map tiles are used by program libraries and SDKs, such as SDK 157, as part of displaying maps on a mobile computing device or a browser. A map application or a browser may request one or more map tiles and process the map tiles to cause display of a visual map.

In an embodiment, map tiles are rendered when requested by a client, like a web browser or a mobile application. Rendering may be performed by a rendering library of a client map application or on a server computer. Example rendering libraries include, but are not limited to, Mapbox GL JS, available from Mapbox, Inc., San Francisco, Calif., the Mapbox iOS SDK, Mapbox Android SDK, the Mapbox GL native renderer, or through a Mapbox API.

In an embodiment, a map tile is rendered based on a map style. Each map style of a plurality of map styles can be used to render the same map tile. In other words, the same portion of electronic map data may be displayed in a variety of visual styles. For example, in one map application, map tiles may be displayed with dark colors while in a second map application, map tiles may be displayed with light colors. Additionally or alternatively, the electronic map data required may differ based on map style. For example, in one map application, roads within a map tile may be displayed while buildings are not displayed. In another map application, landscape and rivers may be displayed while roads are not displayed.

In one embodiment, map style data 140 is digital data that defines one or more visual map styles for electronic maps. May style data 140 may comprise a plurality of map styles. A map style defines the visual appearance of an electronic map, such as what map data to display in the electronic map, what order to render the data in, and how to style the data when it is rendered. In an embodiment, a map style may include information including, but not limited to, references to portions of electronic map data 130, map images, fonts, and rules specifying how the portions of electronic map data 130 should be styled when rendering a digital map, such as colors, line styles, line thickness, and etc.

In an embodiment, each map style may be stored as a document. For example, a map style may be stored as a JSON object that adheres to a particular style format specification. A map style may be generated using a map editing program or written independently and uploaded to a server computer.

In an embodiment, a map style comprises one or more map style layers. Each map style layer may include a reference to a portion of electronic map data and one or more visual style rules to be applied to the portion of electronic map data. In an embodiment, the reference to the portion of electronic map data specifies a particular map data source for the maps style layer. For example, the map style may specify a particular map tile set from a plurality of map tile sets as the map data source for the style layer. Additionally or alternatively, the map style layer may specify a particular data layer within the map tile set to associate with the style layer. For example, a style layer may specify visual style rules for a "Water" data layer of a set of map tiles.

In an embodiment, style layer data may include data indicating a style layer type for a map style layer. A map style layer may be a particular map style layer type, such as lines, polygons, symbols, circles, 3D polygons, and images. Additionally or alternatively, the style layer data may specify property values for one or more style layer properties associated with the style layer type. The style layer data may include data indicating property values to associate with each style layer property. In an embodiment, a property value may be a static value. Additionally or alternatively, the property value may be a dynamic value. For example, the property value may be a zoom level dependent value, such as a function that outputs a property value based on an input zoom level.

Each style layer type has a set of properties for which values may be specified. For example, a line style layer type may include style layer properties such as line width, line color, line style (solid, dotted, dashed), line cap style, line positioning, etc. As another example, a polygon style layer type may include style layer properties such as fill color, fill pattern, opacity, anti-aliasing, fill outline color, polygon positioning, etc.

In an embodiment, mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: receiving map tile requests from client computing devices, sending electronic map data to client computing devices, receiving map style data 140 from map editing applications, receiving electronic map source data 125 from data providers, processing electronic map source data 125 to generate electronic map data 130, and any other aspects of embodiments described herein. Mapping application 110 includes map editing instructions 115 which are programmed or configured to receive and store modified map style data. Additionally or alternatively, map editing instructions 115 may include instructions to perform the process as detailed in FIG. 8.

In one embodiment, map editing instructions 115 are programmed or configured to cause display, in a graphical user interface of a computer display device and in association with a digital map, one or more style layer properties of the digital map, wherein each style layer comprises a plurality of style layer properties. Map editing instructions 115 may be further programmed or configured to receive input specifying a particular style layer of the one or more style layers and display style layer properties of the particular style layer. Map editing instructions 115 may be further programmed or configured to receive input specifying an updated property value for a particular style layer property, assign the updated property value to the particular style layer property, and store an updated map style in map style data 140 that includes the updated property value.

Additionally or alternatively, map editing instructions 115 may include instructions to cause re-display of the digital map in the graphical user interface based on the updated property value for the particular style layer property.

Additionally or alternatively, map editing instructions 115 may include instructions to receive input specifying a property type and cause display of one or more style layer properties of the specified property type.

In an embodiment, map editing instructions 115 may include instructions for causing display of a graphical user interface of a map editing program at client computing devices. Map editing instructions 115 may generate and send instructions to browser 155 to generate the graphical user interface. Additionally or alternatively, map editing instructions 115 may provide data to a map editing application or other software that provides map editing functions as part of the application or software. For example, map editing instructions may send map style data to a map editing application, receive new or updated map style data, and store received map style data to map style data 140.

A map editing program may be used to design a map to a user's specifications by allowing a user to select or upload map data, add custom fonts and images, or define and edit map styles, among other features. In an embodiment, a map editing program includes a map style editor creating custom map styles to a user's specifications. The map style editor may include a graphical user interface through which a user can define a custom map style or edit existing map styles.

Additionally or alternatively, the map style editor may include a visual map. The visual map may be displayed in conjunction with one or more map style layer properties. In an embodiment, the visual map is rendered based on the map style being edited in the map style editor. As changes are made to style layer properties, the visual map may be updated to reflect the changes. For example, if a user specifies a new width property value for roads, the map style editor may automatically re-display the visual map and render any roads shown within the map area using the new width property value.

According to one embodiment, the techniques described herein are implemented by one or more special-purpose computing devices. For example, the server computer 105 and client computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 1B:
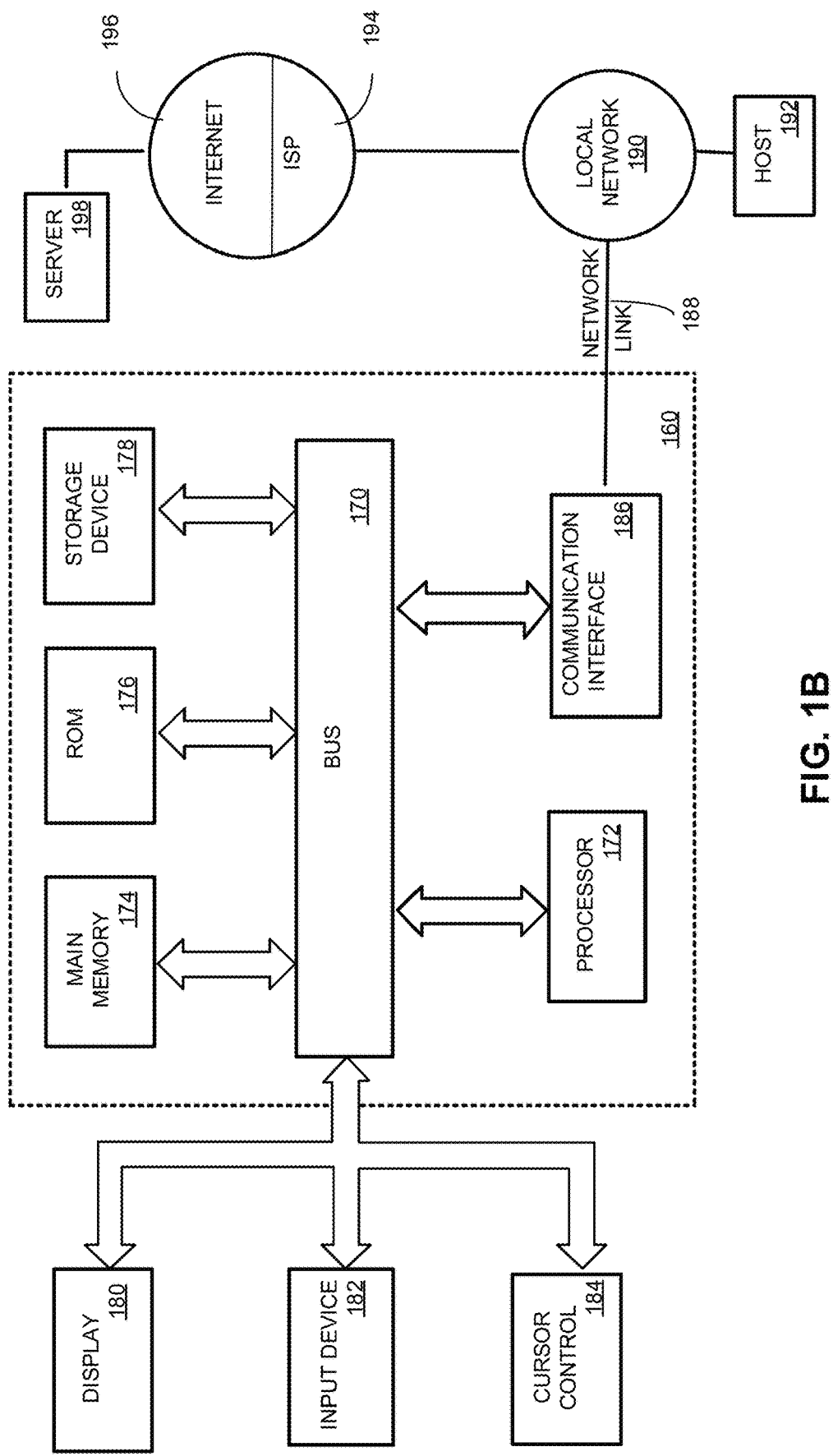
FIG. 1B illustrates a computer system upon which an embodiment may be implemented.

For example, FIG. 1B is a block diagram that illustrates a computer system 160 upon which an embodiment of the invention may be implemented. Computer system 160 includes a bus 170 or other communication mechanism for communicating information, and a hardware processor 172 coupled with bus 170 for processing information. Hardware processor 172 may be, for example, a general purpose microprocessor.

Computer system 160 also includes a main memory 174, such as a random access memory (RAM) or other dynamic storage device, coupled to bus 170 for storing information and instructions to be executed by processor 172. Main memory 174 also may be used for storing temporary variables or other intermediate information during execution of instructions to be executed by processor 172. Such instructions, when stored in non-transitory storage media accessible to processor 172, render computer system 160 into a special-purpose machine that is customized to perform the operations specified in the instructions.

Computer system 160 further includes a read only memory (ROM) 176 or other static storage device coupled to bus 170 for storing static information and instructions for processor 172. A storage device 178, such as a magnetic disk, optical disk, or solid-state drive is provided and coupled to bus 170 for storing information and instructions.

Computer system 160 may be coupled via bus 170 to a display 180, such as a cathode ray tube (CRT), LCD screen, LED screen, or touch screen, for displaying information to a computer user. An input device 182, which may include alphanumeric and other keys, buttons, a mouse, a touchscreen, or other input elements, is coupled to bus 170 for communicating information and command selections to processor 172. In some embodiments, the computer system 160 may also include a cursor control 184, such as a mouse, a trackball, or cursor direction keys for communicating direction information and command selections to processor 172 and for controlling cursor movement on display 180. The cursor control 184 typically has two degrees of freedom in two axes, a first axis (e.g., x) and a second axis (e.g., y), that allows the device to specify positions in a plane.

Computer system 160 may implement the techniques described herein using customized hard-wired logic, one or more ASICs or FPGAs, firmware and/or program logic which in combination with the computer system causes or programs computer system 160 to be a special-purpose machine. According to one embodiment, the techniques herein are performed by computer system 160 in response to processor 172 executing one or more sequences of one or more instructions contained in main memory 174. Such instructions may be read into main memory 174 from another storage medium, such as storage device 178. Execution of the sequences of instructions contained in main memory 174 causes processor 172 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 178. Volatile media includes dynamic memory, such as main memory 174. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 170. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 172 for execution. For example, the instructions may initially be carried on a magnetic disk or solid-state drive of a remote computer. The remote computer can load the instructions into its dynamic memory and send the instructions over a telephone line using a modem. A modem local to computer system 160 can receive the data on the telephone line and use an infra-red transmitter to convert the data to an infra-red signal. An infra-red detector can receive the data carried in the infra-red signal and appropriate circuitry can place the data on bus 170. Bus 170 carries the data to main memory 174, from which processor 172 retrieves and executes the instructions. The instructions received by main memory 174 may optionally be stored on storage device 178 either before or after execution by processor 172.

Computer system 160 also includes a communication interface 186 coupled to bus 170. Communication interface 186 provides a two-way data communication coupling to a network link 188 that is connected to a local network 190. For example, communication interface 186 may be an integrated services digital network (ISDN) card, cable modem, satellite modem, or a modem to provide a data communication connection to a corresponding type of telephone line. As another example, communication interface 186 may be a local area network (LAN) card to provide a data communication connection to a compatible LAN. Wireless links may also be implemented. In any such implementation, communication interface 186 sends and receives electrical, electromagnetic or optical signals that carry digital data streams representing various types of information.

Network link 188 typically provides data communication through one or more networks to other data devices. For example, network link 188 may provide a connection through local network 190 to a host computer 192 or to data equipment operated by an Internet Service Provider (ISP) 194. ISP 194 in turn provides data communication services through the world wide packet data communication network now commonly referred to as the "Internet" 196. Local network 190 and Internet 196 both use electrical, electromagnetic or optical signals that carry digital data streams. The signals through the various networks and the signals on network link 188 and through communication interface 186, which carry the digital data to and from computer system 160, are example forms of transmission media.

Computer system 160 can send messages and receive data, including program code, through the network(s), network link 188 and communication interface 186. In the Internet example, a server 198 might transmit a requested code for an application program through Internet 196, ISP 194, local network 190 and communication interface 186.

The received code may be executed by processor 172 as it is received, and/or stored in storage device 178, or other non-volatile storage for later execution.

Figure 2:
FIG. 2 illustrates a conventional map style editor, according to an embodiment.

FIG. 2 illustrates an example graphical user interface of a map style editor. The map style editor includes style layer list 210 and visual map 230.

In an embodiment, style layer list 210 displays a list of style layers and style layer groups for the selected map style.

Additionally or alternatively, the style layer list 210 indicates the number of layers within each layer group next to the name of the layer group. In the illustrated example, map style layer list 210 lists a plurality of style layers and style layer groups for a map style titled "Bright."

Additionally or alternatively, a user can create, sort, group, and delete layers using the map style editor. In the illustrated example, style layer list 210 includes a toolbar comprising a new layer button, a duplicate layer button 202, a group/ungroup layers button 204, a show/hide layers button 206, and a delete layer button 208. The new layer button causes the map style editor to display a dialog for specifying map data styled by the map style layer, such as a source map tile set, style layer filters, and other information for creating a new map style layer. The duplicate layer button 202 allows a user to copy a style layer or a group of style layers. The group/ungroup layers button 204 groups multiple selected layers or ungroups a group of style layers. The show/hide layers button 206 shows or hides one or more selected style layers on the map. The delete layer button 208 deletes one or more selected style layers from the map style.

Visual map 230 is a visual representation of a particular area of a digital map. In an embodiment, one or more map tiles corresponding to the particular area of the digital map are requested and processed in order to render the visual map. Visual map 230 may be updated or re-redisplayed as a user pans or zooms the map. Additionally or alternatively, visual map 230 may be rendered based on the selected map style that is being edited in the map style editor. When changes are made to the map style, the map style editor may update or re-display visual map 230. In other words, visual map 230 may provide a real-time representation of how digital maps will look if rendered using the selected map style.

In an embodiment, the map style editor displays a list of style layer properties and property values for one or more style layers. A user may view or modify the property value assigned to one or more style layer properties using the map style editor.

Figure 3:
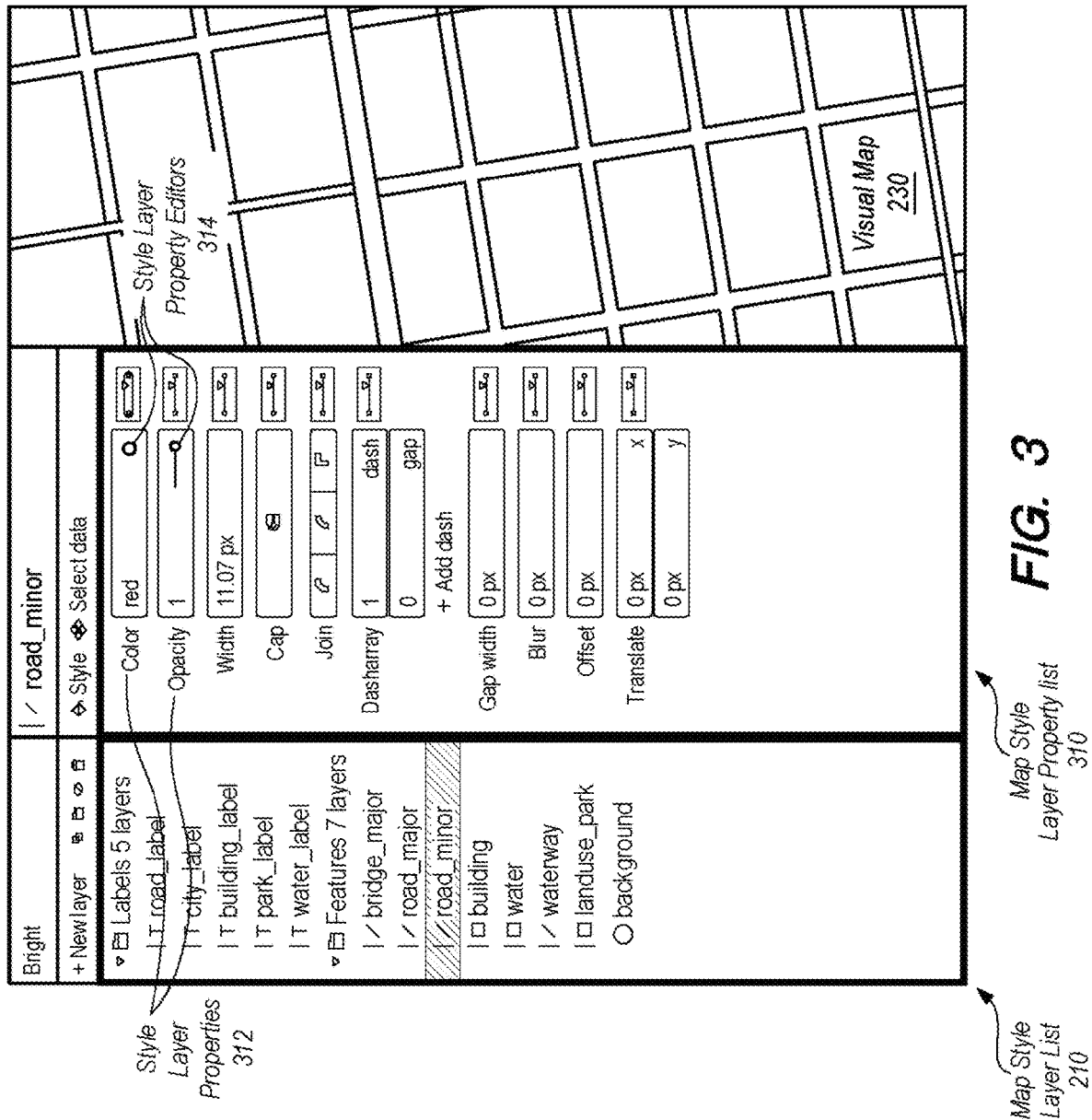
FIG. 3 illustrates a map style layer property list of a conventional map style editor, according to an embodiment.

In an embodiment, selecting one or more style layers in the style layer list 210 allows a user to view and edit the properties for the selected layer(s). FIG. 3 illustrates an example map style layer property list of the map style editor.

In the illustrated example, the "road_street" style layer is selected in style layer list 210. Map style layer property list 310 is displayed in the graphical user interface. Style layer property list 310 displays style layer properties that are associated with a selected style layer. Additionally or alternatively, style layer property list 310 displays the property value assigned to each style layer property. In the present example, style layer property list 220 includes a plurality of style layer properties for the "road_street" style layer, such as the ones indicated by the label style layer properties 222.

In an embodiment, style layer property list 310 includes a property editor for one or more style layer properties, such as the style layer property editors 314 indicated for style layer properties 312. In the example illustrated in FIG. 3, the Color, Pattern, and Opacity style layer properties each have a corresponding text field. The text fields indicate the current value of each style layer property. Selecting a property editor may bring up a graphical editor where the user can select a value for the property, such as a color selection panel for the Color property. A user may also edit the property value by typing or pasting text into the text field, or adjust a numerical value using arrow keys. Other properties may have buttons or other types of user interface components that allow a user to select or specify a property value.

In an embodiment, if a user modifies a value for a property, visual map 230 is redisplayed to reflect the updated property value. Additionally or alternatively, the property editor may be updated to display the updated property value.

In some embodiments, a user selects a template from a plurality of templates from a home page. In some other embodiments, the map style editor displays a "Choose a template" control element (not shown in FIGS. 2 and 3), such as a button. Upon receiving selection of the "Choose a template" control element, the map style editor displays a plurality of map templates. An example of the plurality of templates is described below in detail with reference to FIG. 4.

Figure 4:
FIG. 4 illustrates a featured map template and other map templates designated to a particular use case, according to an embodiment.

FIG. 4 illustrates a featured map template and other map templates designated to a use case, according to an embodiment. Each map template of the plurality of map templates includes a set of map style layers. The set of map style layers of one map template may be different than that of another map template. In some embodiments, the map style editor displays a plurality of use cases, and each map template of the plurality of map templates is designated to a use case of the plurality of use cases. A use case is a specific situation in which the map template could potentially be used. Example use cases include general purpose, fitness and outdoor, BI and data visualization, travel, social, and real estate. In the present example, a "Top use cases" column includes "All," "General purpose," "Fitness & outdoor," "BI & data visualization," "Travel," "Social," "Real estate," and navigation use cases, but is not limited thereto. The "Top use cases" column may include other use cases not shown in FIG. 4. In some embodiments, the map style editor is configured to display the map templates designated to the "All" use case by default. That is, the map style editor displays all the plurality of map templates. In the example illustrated by FIG. 4, the map style editor displays key features and map templates designated to the "Fitness and outdoor" use case.

The key features are map style layers that are common to map templates designated to a use case. The key features may be preselected based on the use case. In the present example, the key features for "Fitness & outdoor" map templates include hill shading, contour lines, pedestrian, and bike paths map style layers. These map style layers may be contained in the set of map style layers of a map template designated to a "Fitness and outdoor" use case.

The plurality of map templates designated to the "Fitness & outdoor" use case includes a featured map template 430 and other fitness & outdoor templates 440. The featured map template 430 includes a name of the featured map template 430 (i.e. "Le Shine"), a description of the featured map template 430 (i.e. "A restrained color palette reminiscent of winter's cold, glaring austerity."), a graphical user interface element to customize the featured map template 430 (i.e. "Customize this template" button), and a graphical user interface element to preview the featured map template 430 (i.e. "Preview template" button). The featured map template 430 may be, e.g., the most popular template or the newest template designated to the use case. In some embodiments, the mapping application 110 suggests the featured map template 430 based on a user affinity (e.g., color preference, previously used map templates, etc.).

In some embodiments, upon receiving selection of the "Customize this template" button, the map style editor displays a simplified map style editor with the featured map template 430 template applied to the visual map. The simplified map style editor and its operation is described below in detail with reference to FIGS. 5-7.

In some embodiments, upon receiving selection of the "Preview template" button, the map style editor displays a preview with the featured map template 430 applied to a visual map. Alternatively, the preview is an enlarged view of the featured map template 430. The preview may be displayed, e.g., in a separate window, in a separate tab, or within the map style editor. A user may apply the featured map template 430 to the visual map and/or exit the preview.

The other fitness & outdoor templates 440 are other templates besides the featured map template 430 that are designated to the "Fitness & outdoor" use case. The other fitness & outdoor templates 440 have different themes (e.g., colors, fonts, icons, etc.) than that of the featured map template 430. In the example illustrated by FIG. 4, the other fitness & outdoor templates 440 are "Odyssey," "Scenic," and "Vintage." In some embodiments, the other fitness & outdoor templates 440 share the same key features 420 as the featured map template 430 and are designated to the same use case as the featured map template 430. For example, each of the "Odyssey," "Scenic," and "Vintage" templates include hill shading, contour lines, pedestrian, and bike paths map style layers. Alternatively, the other fitness & outdoor templates 440 are placeholder map templates designated to other use cases.

Figure 5A:
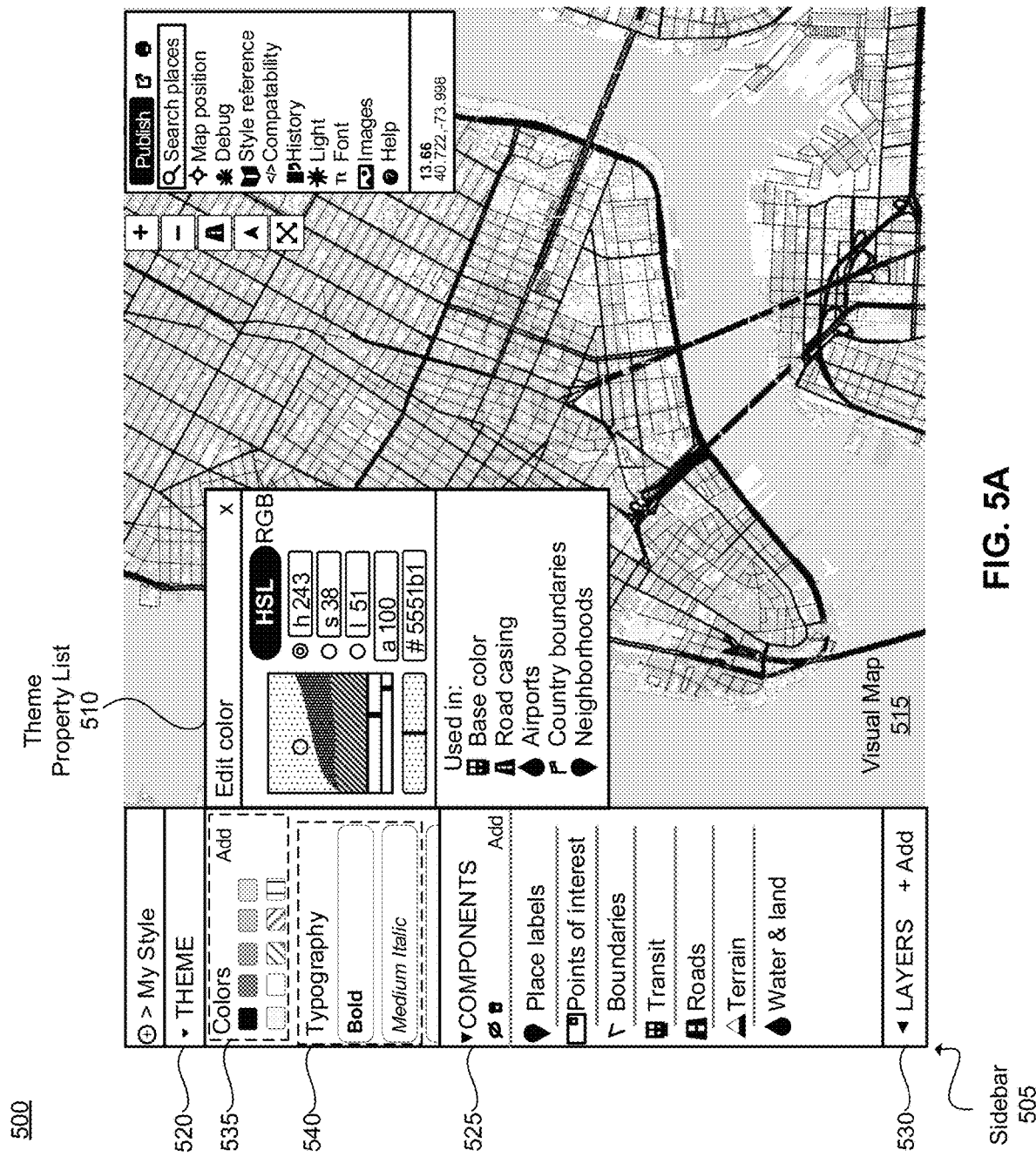
FIG. 5A illustrates editing a theme in a sidebar of a simplified map style editor, according to an embodiment.

FIG. 5A illustrates editing a theme in a sidebar 505 of a simplified map style editor 500, according to an embodiment. In the example illustrated by FIG. 5A, the simplified map style editor 500 includes a sidebar 505, a theme property list 510, and a visual map 515. The sidebar 505 includes a "THEME" drop down control 520, a "COMPONENTS" drop down control 525, and a "LAYERS" drop down control 530.

The "THEME" drop down control 520 displays a rectangular portion including, e.g., colors, fonts, and icons. In the present example, the "THEME" drop down control 540 displays a rectangular portion including "Colors" 535 and "Typography" 540.

"Colors" 535 allows a user to edit colors applied to map style layers by components. "Colors" 535 includes a plurality of color presets (e.g., 10 color presets). Responsive to receiving selection of a color preset from the plurality of color presets, the map style editor 500 displays a theme property list 510 called "Edit color." Within the "Edit color" theme property list 510, a user may edit the selected color preset by hue, saturation, lightness (HSL), RGB color model, opacity, and/or hex number. The "Edit color" theme property list 510 also includes map style layers in which the selected color preset is applied. In the present example, the selected color preset is used in "Base color," "Road casing," "Airports," "Country boundaries," and "Neighborhoods" map style layers. The other color presets may be used in other map style layers. The color presets, the number of color presets, and/or the map style layers in which the color presets are applied may be based on the selected template.

"Typography" 540 allows a user to edit the style and appearance of text displayed in the visual map 515. "Typography" 540 may include control elements for, e.g., selecting fonts, point sizes, letter-spacing, adjusting the space between pairs of letters, and the like. In the present example, "Typography" 540 includes a "Bold" button and a "Medium Italic" button. For example, responsive to receiving selection of the "Bold" button, the map style editor 500 displays a theme property list called "Bold" (not shown in FIG. 5A). Similar to the "Edit color" theme property list 510, the "Bold" theme property list may include map style layers where bold text is used to make the text more visible. "Typography" 540 may include other buttons such as Black, Black Italic, Bold Medium, Regular, Italic, Light, Light Italic, Thin, and Thin Italic (not shown in FIG. 5A), or any other style specified by a typographic style author for inclusion within the set of available typographic styles.

The "COMPONENTS" drop down control 525 displays a rectangular portion including a plurality of components. A component is a set of map style layers and is a subset of the set of map style layers of a template. That is, all the elements (i.e. map style layers) of the component are contained in the template. In some embodiments, a component contains two or more map style layers. In some embodiments, the union of the plurality of components is equal to the template. The components may include, e.g., points of interest labels, boundaries, transit, roads, terrain, water and land, buildings, satellite imagery, choropleth, heatmap, scaled points, and dot density. In the present example, the "COMPONENTS" drop down control 525 displays a rectangular portion including "Place labels," "Points of interest," "Boundaries," "Transit," "Roads," "Terrain," and "Water & land" components. The components, the number of components, and/or the map style layers in which an edit to a component is applied may be based on the selected template. Editing a component is described below in detail with reference to FIG. 5C.

Figure 5B:
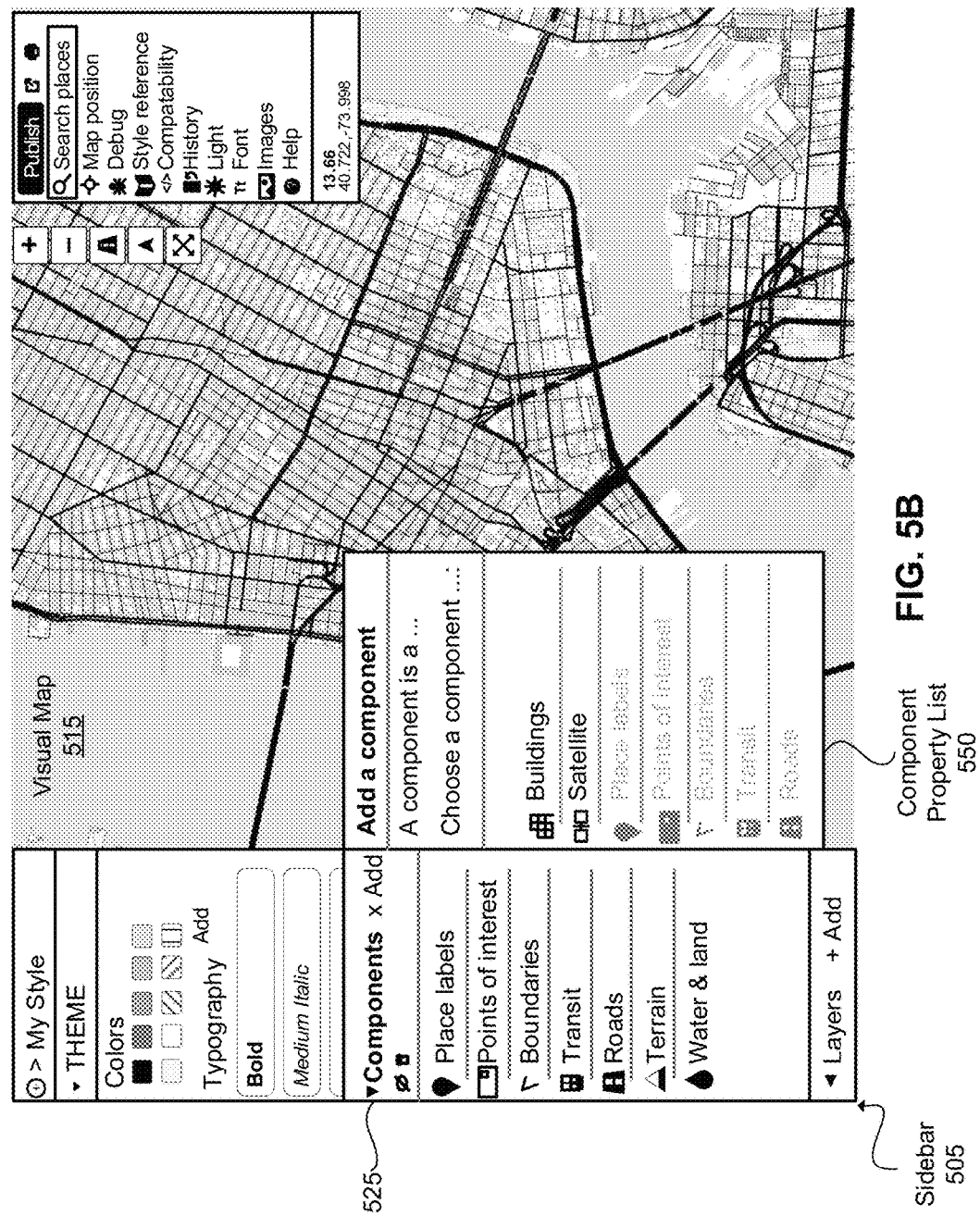
FIG. 5B illustrates adding a component to a sidebar of a simplified map style editor, according to an embodiment.

FIG. 5B illustrates adding a component to a sidebar 505 of a simplified map style editor 545, according to an embodiment. Responsive to receiving selection of the "+Add" button under the "COMPONENTS" drop down control 525, the simplified map style editor 545 displays a component property list 550 called "Add a component." Within the "Add a component" component property list 550, a user may choose one or more components to add to the plurality of components under the "COMPONENTS" drop down control 525. In some embodiments, the "Add a component" component property list 550 displays other components that are not part of the plurality of components under the "COMPONENTS" drop down control 525. Additionally or optionally, the "Add a component" component property list 550 displays components that are part of the plurality of components under the "COMPONENTS" drop down control 525. In the present example, the "Add a component" component property list 550 displays "Buildings" and "Satellite" components that are not part of the plurality of components. A user may add one or more of these components to the plurality of components. The "Add a component" component property list 550 also displays "Place labels," "Points of interest," "Boundaries," "Transit," "Roads" components that are part of the plurality of components. A user may also remove one or more components from the plurality of components.

Figure 5C:
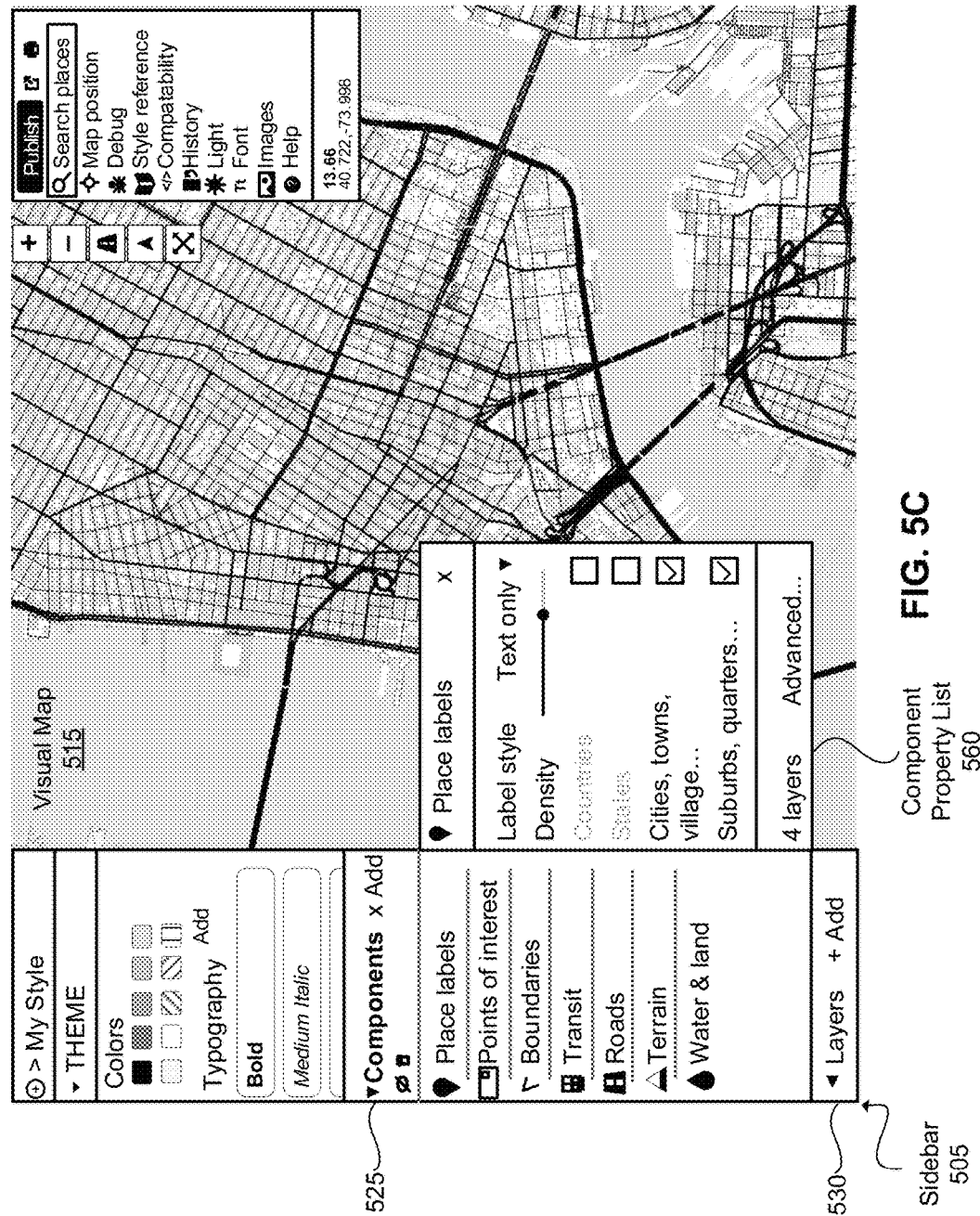
FIG. 5C illustrates editing a component in a sidebar of a simplified map style editor, according to an embodiment.

FIG. 5C illustrates editing a component in a sidebar 505 of a simplified map style editor 555, according to an embodiment. In the example illustrated by FIG. 5C, the "Place labels" component is selected from the plurality of components under the "COMPONENTS" drop down control 525. Responsive to receiving selection of the "Place labels" component, the simplified map style editor 555 displays a component property list 560 called "Place labels." The "Place labels" component property list 560 includes "Label style," "Density," "Countries," "States," "Cities, towns, village . . . ," and "Suburbs, quarters . . . " The "Place labels" component property list 560 displays the number of map style layers (e.g., 4 layers) contained in the "Place labels" component (i.e. cardinality of the set).

In the present example, the "Place labels" component property list 560 includes a slider graphical control element in which a user edits a property value (e.g., "Density") by moving an indicator in a horizontal or vertical fashion. For example, moving the indicator to the right results in more place labels being shown in the visual map 515 and moving the indicator to the left results in fewer place labels being shown in the visual map 515. An edit to a property value in the "Place labels" component property list is applied to the four map style layers contained in the "Place labels" component. In some embodiments, the mapping application 110 suggests another edit to another property in the component property list based on predetermined map design principles.

Initially, the "LAYERS" drop down control 530 is configured to hide the map style layers of the template. Responsive to receiving selection of the "Advanced . . . " button under the "Place labels" component property list 560, the four map style layers contained in the "Place labels" component are converted to individual map style layers. The individual map style layers are displayed under the "LAYERS" drop down control 530.

In some embodiments, upon receiving selection of the "+Add" button under the "LAYERS" drop down control 530, the simplified map style editor 555 displays other map style layers not contained in the template (not shown in FIG. 5C). A user may select one or more map style layers from the other map style layers to add to the template. In some embodiments, the map style editor displays available data sources or the option to upload a new data source. A user may select one or more map style layers to remove from the template.

Figure 6:
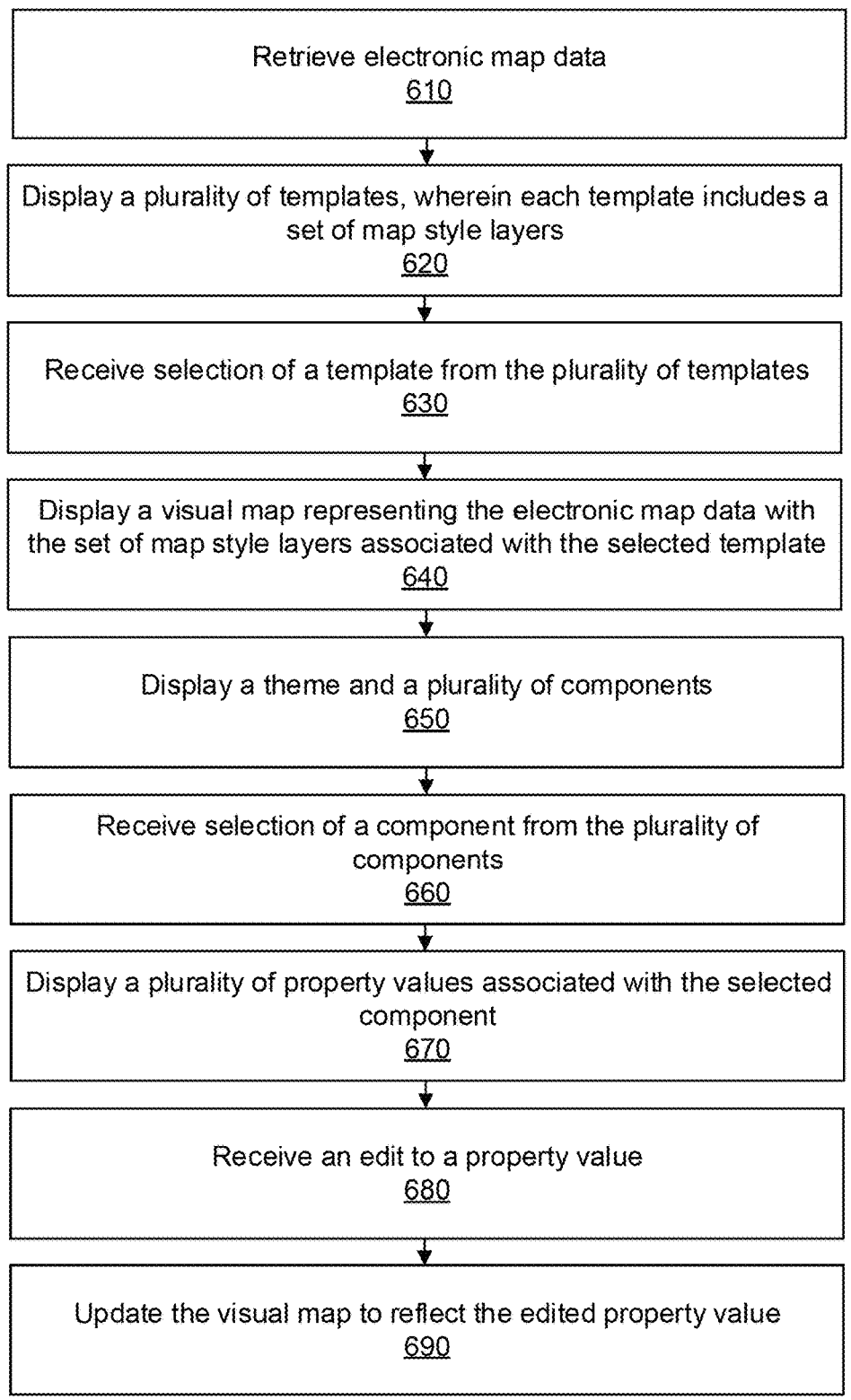
FIG. 6 illustrates a flowchart of a process for editing and representing property values for a digital map, according to an embodiment.

Referring to FIG. 6, a flowchart 600 is shown of a process for editing and representing property values for a digital map, according to one embodiment. In various embodiments, the operations of the process of FIG. 6 may be implemented in programming by a server computer 105 or its components as described herein. For example, the operations of process 600 may be performed by the mapping application. In some examples, the server computer 105 may execute a set of instructions or sequence of instructions to control the functional elements of server computer 105 to perform the functions described below. Additionally or alternatively, server computer 105 may perform aspects of the functions described below using special-purpose hardware. In some embodiments, the map editing instructions 115 may instruct the server computer to interact with the database 120 to perform the functions described below using database interface 117. The process steps with dashed outlines represent optional steps. In some embodiments, one or more functions described below may be performed by the client computing device 145.

Initially, the server computer 105 executing the mapping application 110 retrieves 610 electronic map data from a style sheet corresponding to a vector map tile set for a digital map. The server computer 105 executing the mapping application 110 displays 620 a plurality of templates. Each template includes a set of map style layers, and each map style layer references a portion of the electronic map data and one or more visual style rules to apply to the portion. The server computer 105 executing the mapping application 110 receives 630 selection of a template from the plurality of templates. The server computer 105 executing the mapping application 110 displays 640 a visual map representing the electronic map data with the set of map style layers of the selected template. The server computer 105 executing the mapping application 110 displays 650 in a sidebar a theme and a plurality of components. Each component of the plurality of components is a set of map style layers and is a subset of the set of map style layers of the template. The server computer 105 executing the mapping application 110 receives 660 selection of a component from the plurality of components. The server computer 105 executing the mapping application 110 displays 670 in a component property list a plurality of property values associated with the selected component. The server computer 105 executing the mapping application 110 receives 680 in the component property list an edit to a particular property value. The server computer 105 executing the mapping application 110 updates 690 the visual map to reflect the edited value. The edited value is applied to the set of map style layers of the component.

What is claimed is:

1. A method, comprising:
   displaying a plurality of use cases, wherein each template of a plurality of templates is assigned to a use case, each template comprises a set of map style layers, and each template assigned to a use case has a different theme for one or more respective map style layers;
   receiving selection of a use case from the plurality of use cases;
   displaying a graphical user interface representing respective templates of the plurality of templates that are assigned to the selected use case, wherein one of the respective templates is a featured template visually distinguished from other templates in the graphical user interface;
   receiving selection of a respective template in the graphical user interface;
   displaying a digital map representing map data according to the set of map style layers of the selected template; and
   displaying, in a sidebar, the theme of the selected template and a corresponding plurality of components, wherein each component is a subset of the set of map style layers of the template comprising similar style layer properties.

2. The method of claim 1, wherein the featured template includes at least one of a name of the featured template, a description of the featured template, a graphical user interface element to customize the featured template, and a graphical user interface element to preview the featured template.

3. The method of claim 1, wherein the plurality of use cases includes at least one of all, general purpose, fitness and outdoor, data visualization, travel, social, real estate, and navigation.

4. The method of claim 1, wherein the respective templates assigned to the selected use case have map style layers in common.

5. The method of claim 1, further comprising:
   displaying other map style layers not contained in the set of map style layers of the template;
   receiving selection of one or more map style layers from the other map style layers; and
   adding the selected one or more map style layers to the set of map style layers of the template.

6. The method of claim 1, wherein each map style layer comprises one or more style layer properties defining visual representations of map features of a map data layer to which the map style layer corresponds.

7. The method of claim 1, wherein each theme comprises one or more preset style layer properties.

8. A non-transitory computer-readable storage medium comprising instructions, the instructions when executed by a computer processor performing actions comprising:
   displaying a plurality of use cases, wherein each template of a plurality of templates is assigned to a use case, each template comprises a set of map style layers, and each template assigned to a use case has a different theme for one or more respective map style layers;

receiving selection of a use case from the plurality of use cases;

displaying a graphical user interface representing respective templates of the plurality of templates that are assigned to the selected use case, wherein one of the respective templates is a featured template visually distinguished from other templates in the graphical user interface;

receiving selection of a respective template in the graphical user interface;

displaying a digital map representing map data according to the set of map style layers of the selected template; and displaying, in a sidebar, the theme of the selected template and a corresponding plurality of components, wherein each component is a subset of the set of map style layers of the template comprising similar style layer properties.

9. The non-transitory computer-readable storage medium of claim 8, wherein the featured template includes at least one of a name of the featured template, a description of the featured template, a graphical user interface element to customize the featured template, and a graphical user interface element to preview the featured template.

10. The non-transitory computer-readable storage medium of claim 8, wherein the plurality of use cases includes at least one of all, general purpose, fitness and outdoor, data visualization, travel, social, real estate, and navigation.

11. The non-transitory computer-readable storage medium of claim 8, wherein the respective templates assigned to the selected use case have map style layers in common.

12. The non-transitory computer-readable storage medium of claim 8, further comprising:
displaying other map style layers not contained in the set of map style layers of the template;
receiving selection of one or more map style layers from the other map style layers; and
adding the selected one or more map style layers to the set of map style layers of the template.

13. The non-transitory computer-readable storage medium of claim 8, wherein each map style layer comprises one or more style layer properties defining visual representations of map features of a map data layer to which the map style layer corresponds.

14. The non-transitory computer-readable storage medium of claim 8, wherein each theme comprises one or more preset style layer properties.

15. A system, comprising:
a processor; and
a non-transitory computer-readable storage medium comprising instructions, the instructions when executed by a computer processor performing actions comprising:
displaying a plurality of use cases, wherein each template of a plurality of templates is assigned to a use case, each template comprises a set of map style layers, and each template assigned to a use case has a different theme for one or more respective map style layers;
receiving selection of a use case from the plurality of use cases;
displaying a graphical user interface representing respective templates of the plurality of templates that are assigned to the selected use case, wherein one of the respective templates is a featured template visually distinguished from other templates in the graphical user interface;
receiving selection of a respective template in the graphical user interface;
displaying a digital map representing map data according to the set of map style layers of the selected template; and
displaying, in a sidebar, the theme of the selected template and a corresponding plurality of components, wherein each component is a subset of the set of map style layers of the template comprising similar style layer properties.

16. The system of claim 15, wherein the featured template includes at least one of a name of the featured template, a description of the featured template, a graphical user interface element to customize the featured template, and a graphical user interface element to preview the featured template.

17. The system of claim 15, wherein the plurality of use cases includes at least one of all, general purpose, fitness and outdoor, data visualization, travel, social, real estate, and navigation.

18. The system of claim 15, wherein the respective templates assigned to the selected use case have map style layers in common.

19. The system of claim 15, further comprising:
displaying other map style layers not contained in the set of map style layers of the template;
receiving selection of one or more map style layers from the other map style layers; and
adding the selected one or more map style layers to the set of map style layers of the template.

20. The system of claim 15, wherein each theme comprises one or more preset style layer properties.

* * * * *